United States Patent
Yokoyama

(10) Patent No.: US 8,938,022 B2
(45) Date of Patent: Jan. 20, 2015

(54) SYSTEM FOR DISTRIBUTED INTERFERENCE ALIGNMENT

(75) Inventor: Akihisa Yokoyama, Cupertino, CA (US)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 318 days.

(21) Appl. No.: 13/295,005

(22) Filed: Nov. 11, 2011

(65) Prior Publication Data
US 2013/0121434 A1 May 16, 2013

(51) Int. Cl.
*H04B 15/00* (2006.01)
*H04L 25/49* (2006.01)
*H04J 11/00* (2006.01)

(52) U.S. Cl.
CPC ............ *H04B 15/00* (2013.01); *H04L 25/49* (2013.01); *H04J 11/003* (2013.01)
USPC .......... 375/285; 370/329; 370/310; 370/328; 375/267; 375/296; 375/260; 375/295; 375/316; 455/501

(58) Field of Classification Search
CPC .............. H04L 25/03343; H04L 25/03898; H04B 7/024; H04B 7/0456; H04B 7/0617; H04B 15/00; H04B 7/0413; H04B 7/0473; H04W 72/082; H04W 72/121; H04W 88/02
USPC .......... 370/329, 310, 328; 375/267, 296, 285, 375/260, 295, 316; 455/501
See application file for complete search history.

(56) References Cited

U.S. PATENT DOCUMENTS

| | | | |
|---|---|---|---|
| 2011/0051837 A1* | 3/2011 | Park et al. | 375/285 |
| 2011/0200132 A1* | 8/2011 | Kim et al. | 375/267 |
| 2012/0281778 A1* | 11/2012 | Ruan et al. | 375/267 |
| 2012/0281780 A1* | 11/2012 | Huang et al. | 375/267 |

* cited by examiner

*Primary Examiner* — Leila Malek
(74) *Attorney, Agent, or Firm* — Patent Law Works LLP

(57) ABSTRACT

A system and method for realizing distributed interference alignment is disclosed. The system comprises a retrieving module, a determination module and a precoding module. The retrieving module retrieves source data. The determination module generates data describing one or more requirements for one or more associated Interference Alignment (IA) groups. The precoding module calculates a precoding vector based at least in part on the data describing the one or more requirements for the one or more associated IA groups. The precoding module is communicatively coupled to the retrieving module to receive the source data. The precoding module generates a transmission signal based at least in part on the precoding vector and the source data.

21 Claims, 11 Drawing Sheets

SYSTEM FOR DISTRIBUTED INTERFERENCE ALIGNMENT

BACKGROUND

The specification relates to interference alignment systems. In particular, the specification relates to a system and method for autonomously realizing distributed interference alignment.

Interference Alignment (IA) is a technology to inhibit interference on the receiving side. By applying this technology, each transmitting system should control its transmission signals in order to align noise or interference components and to allow the noise or the interference components to be eliminated on the receiving side.

Existing IA systems have numerous problems. For example, in these systems all communication systems that use the same wireless resources are involved and controlled synchronously. As a result, these systems struggle to achieve stable vehicle-to-vehicle communication.

SUMMARY OF THE INVENTION

The specification overcomes the deficiencies and limitations of the prior art at least in part by providing a system and method for realizing distributed interference alignment. The system comprises a retrieving module, a determination module and a precoding module. The retrieving module retrieves source data. The determination module is communicatively coupled to the retrieving module. The determination module generates data describing one or more requirements for one or more associated IA groups. The precoding module is communicatively coupled to the determination module. The precoding module calculates a precoding vector based at least in part on the data describing the one or more requirements for the one or more associated IA groups. The precoding module is also communicatively coupled to the retrieving module to receive the source data. The precoding module generates a transmission signal based at least in part on the precoding vector and the source data.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
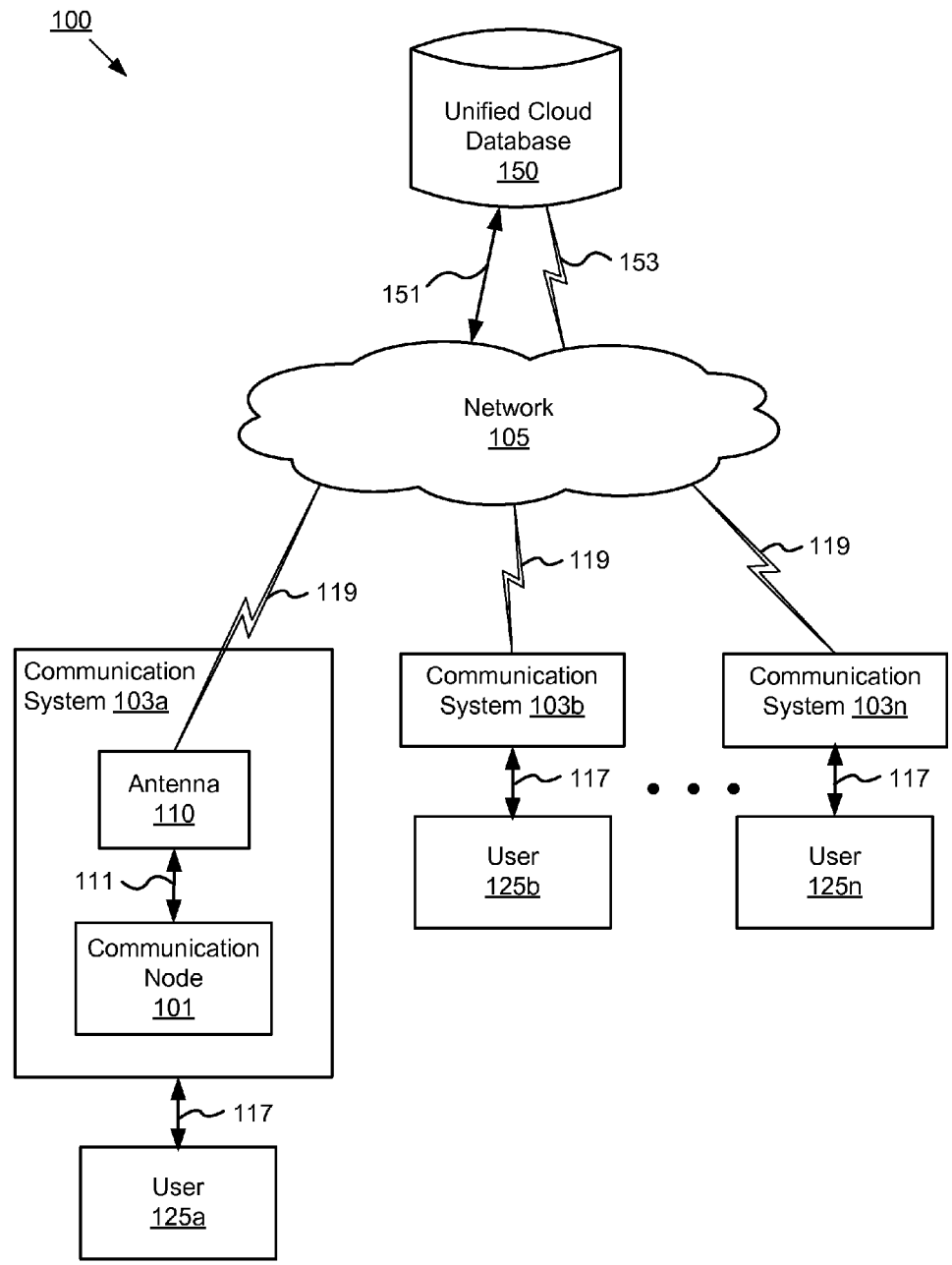
FIG. 1 is a high-level block diagram illustrating a system for realizing distributed interference alignment according to one embodiment.

A system and method for realizing distributed interference alignment is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, compact disc read-only memories (CD-ROMs), magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for realizing distributed interference alignment according to one embodiment. The illustrated system 100 includes communication systems 103a, 103b, 103n (referred to individually or collectively as communication systems 103) that are accessed by users 125a, 125b, 125n (also referred to collectively or individually as users 125) and a unified cloud database 150. In the illustrated embodiment, the communication systems 103 and the unified cloud database 150 are communicatively coupled via a network 105. For example, the communication systems 103 are communicatively coupled to one another via the network 105 to facilitate transmitting and receiving information (e.g., traffic information) between users 125 of the communication systems 103.

Although three communication systems 103a, 103b, 103n and one unified cloud database 150 are illustrated in FIG. 1, persons having ordinary skill in the art will recognize that any number of communication systems 103 and unified cloud databases 150 can be communicatively coupled to the network 105. Furthermore, while only one network 105 is coupled to the communication system 103 and the unified cloud database 150, persons having ordinary skill in the art will appreciate that any number of network 105 can be connected to the communication system 103 and the unified cloud database 150.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or include portions of a telecommunications network for sending data in a variety of different communication protocols. For example, the network 105 is a 3G network or a 4G network. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, e-mail, etc. In yet another embodiment, all or some of the links in the network 105 are encrypted using conventional encryption technologies such as secure sockets layer (SSL), secure HTTP and/or virtual private networks (VPNs).

In the illustrated embodiment, the unified cloud database 150 is communicatively coupled to the network 105 via signal line 151 and signal line 153 (wirelessly). The communication system 103a is communicatively coupled to the network 105 via signal line 119 (wirelessly). The user 125a interacts with the communication system 103a as represented by signal line 117. Communication systems 103b, 103n and users 125b, 125n are coupled and interface in a similar manner respectively.

The communication system 103 is any system for transmitting and/or receiving information to and from other communication systems 103. The communication system 103 exchanges information with other communication systems 103 via a network 105. The communication system 103 that transmits signals in a communication scenario is referred as to a transmitting communication system 103. The communication system 103 that receives signals in a communication scenario is referred as to a receiving communication system 103. In one embodiment, the communication system 103 works either as a receiving communication system 103 or a transmitting communication system 103 coupled to a network 105. In another embodiment, the communication system 103 works as both a receiving communication system 103 and a transmitting communication system 103 coupled to a network 105.

In one embodiment, the communication system 103 is embedded in a vehicle. In another embodiment, the communication system 103 is included in a roadside station. For example, a communication system 103 in a vehicle exchanges information (e.g., safety warnings and traffic information) with communication systems 103 in other vehicles.

In the illustrated embodiment, the communication system 103a includes an antenna 110 and a communication node 101. The antenna 110 is communicatively coupled to the communication node 101 via signal line 111. Although the antenna 110 and the communication node 101 are shown in reference to the communication system 103*a*, persons having ordinary skill in the art will recognize that any communication system 103 may comprise these elements. The antenna 110 is communicatively coupled to the network 105 via signal line 119 (wirelessly).

The unified cloud database 150 is an online database accessible from the network 105. For example, the unified cloud database 150 is a database where data is stored on multiple virtual servers hosted by different companies. In one embodiment, the unified cloud database 150 stores any data for providing the functionality of the system 100. In another embodiment, the unified cloud database 150 stores data received from a plurality of communication systems 103 embedded in a plurality of vehicles.

Communication Node 101

Figure 2:
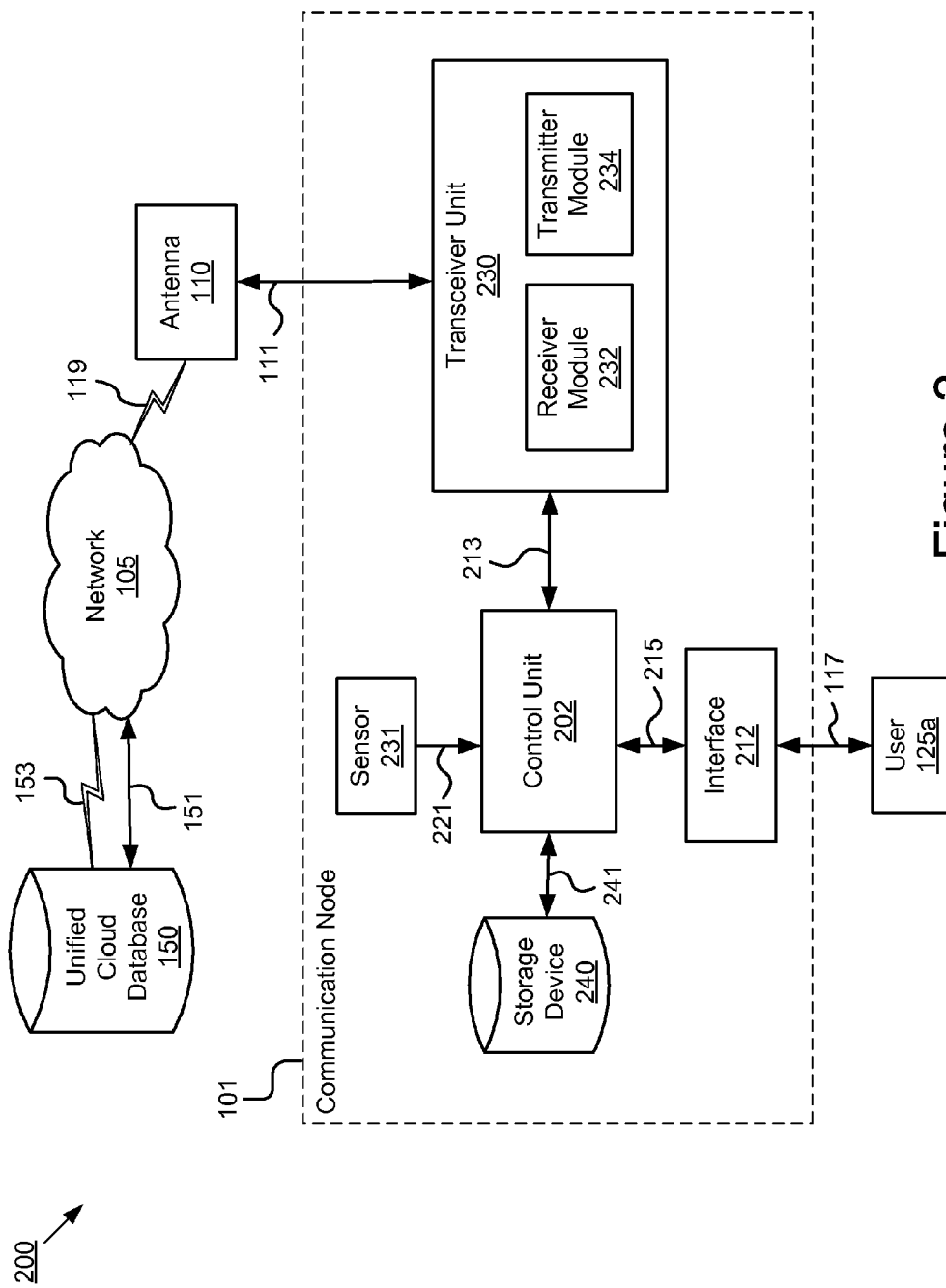
FIG. 2 is a block diagram illustrating a communication system including a communication node in detail according to one embodiment.

Referring now to FIG. 2, depicted is an embodiment 200 of the communication system 103 showing the communication node 101 in more detail. The illustrated communication node 101 includes a control unit 202, a sensor 231, an interface 212, a storage device 240 and a transceiver unit 230. Although only one sensor 231, one control unit 202, one interface 212, one storage device 240 and one transceiver unit 230 are depicted in FIG. 2, persons having ordinary skill in the art will recognize that the communication node 101 can include any number of sensors 231, control units 202, interfaces 212, storage devices 240 and transceiver units 230. Furthermore, persons having ordinary skill in the art will also appreciate that the communication node 101 may include other entities not shown in FIG. 2 such as a camera, an input device, etc.

In the illustrated embodiment, the sensor 231 is communicatively coupled to the control unit 202 via signal line 221. The interface 212 is communicatively coupled to the control unit 202 via signal line 215. The user 125*a* interacts with the interface 212 as represented by signal line 117. The storage device 240 is communicatively coupled to the control unit 202 via signal line 241. The transceiver unit 230 is communicatively coupled to the control unit 202 via signal line 213. The transceiver unit 230 is communicatively coupled to the antenna 110 via signal line 111.

The communication node 101 is any device that transmits signals and processes received signals. For example, the communication node 101 includes a Dedicated Short Range Communications (DSRC) device. In one embodiment, the communication node 101 is embedded in a vehicle. In another embodiment, the communication node 101 is embedded in a roadside station.

In one embodiment, the communication node 101 transmits and receives signals to and from the antenna 110. The antenna 110 transmits and receives signals wirelessly to and from the network 105. In one embodiment, the communication node 101 in a vehicle transmits and receives signals to and from communication nodes 101 in other vehicles via the network 105. In another embodiment, the communication node 101 in a vehicle transmits and receives signals to and from communication nodes 101 embedded in roadside stations.

The control unit 202 is any processor-based computing device. For example, the control unit 202 is an electronic control unit ("ECU") implemented in a vehicle. In one embodiment, the control unit 202 is implemented using a single integrated circuit such as a system-on-chip (SOC). In one embodiment, the control unit 202 receives one or more sensor signals from the sensor 231. The control unit 202 processes the one or more sensor signals. The control unit 202 generates sensor data based on the processed sensor signals. The control unit 202 transmits the sensor data to the storage device 240 for storage. For example, the control unit 202 receives a sensor signal describing a velocity of the vehicle. The control unit 202 analyzes the sensor signal and generates sensor data based at least in part on the sensor signal. The sensor data indicates the velocity of the vehicle. The control unit 202 then transmits the sensor data to the storage device 240 for storage.

In one embodiment, the control unit 202 generates source data based on the sensor data. For example, the control unit 202 determines information useful to vehicles based on the sensor data. The control unit 202 transmits the information useful to vehicles to the storage device 240. The storage device 240 stores the information useful to vehicles as source data. For example, source data includes data describing one or more of a traffic condition, a safety warning, a road condition, a status and/or action of a vehicle, etc. A status of a vehicle can be driving normally or out of control. An action of a vehicle can be accelerating, changing lanes, exiting a highway, etc. In one embodiment, the control unit 202 transmits source data to the transceiver unit 230 to provide information useful to vehicles to communication systems 103 in other vehicles.

In one embodiment, the control unit 202 receives incoming data from the transceiver unit 230. For example, one or more signals are received from communication systems 103 in other vehicles via the transceiver unit 230. The transceiver unit 230 processes the received one or more signals to generate incoming data. The control unit 202 then stores the incoming data in the storage device 240. For example, incoming data includes data describing one or more of a traffic condition, a safety warning, a road condition, a status and/or action of a vehicle, etc. In one embodiment, incoming data is information useful to vehicles that passed by communication systems 103 in other vehicles.

In one embodiment, the control unit 202 displays received incoming data to a user 125 through the interface 212. For example, the control unit 202 receives incoming data describing that there is a dense fog ahead. The control unit 202 then displays the incoming data as a message saying "there is a dense fog ahead" on the interface 212 to a user 125 such as a driver. In other examples, the control unit 202 notices a user 125 of incoming data using a voice prompt.

In one embodiment, the control unit 202 comprises, among other things, a processor (not pictured). In another embodiment, the control unit 202 includes other components conventional to a control unit such as a memory (not pictured) and an I/O interface (not pictured).

The processor (not pictured) comprises an arithmetic logic unit, a microprocessor, a general purpose controller or some other processor array to perform computations, retrieve data stored on the storage device 240, etc. The processor processes data signals and may comprise various computing architectures including a complex instruction set computer (CISC) architecture, a reduced instruction set computer (RISC) architecture, or an architecture implementing a combination of instruction sets. The processing capability of the processor may be limited to supporting the display of images and the capture and transmission of images. The processing capability of the processor might be enough to perform more complex tasks, including various types of feature extraction and sampling. It will be obvious to one skilled in the art that other processors, operating systems, sensors, displays and physical configurations are possible.

The transceiver unit 230 is any computing device for generating transmission signals based at least in part on source data and processing signals received from antenna 110. In the illustrated embodiment, the transceiver unit 230 comprises a receiver module 232 and a transmitter module 234. Although one receiver module 232 and one transmitter module 234 are depicted with reference to the transceiver unit 230, persons having ordinary skill in the art will recognize that transceiver unit 230 can include any number of receiver modules 232 and transmitter modules 234.

The receiver module 232 is code and routines for processing one or more received signals. For example, the receiver module 232 converts a radio signal from a modulated radio wave into usable information such as audio, video and other data. In one embodiment, the receiver module 232 is implemented using hardware such as field-programmable gate array (FPGA) or an application-specific integrated circuit (ASIC). In another embodiment, the receiver module 232 is implemented using a combination of hardware and software.

In one embodiment, the receiver module 232 converts a received signal into incoming data. For example, the receiver module 232 receives one or more radio signals from the network 105 via the antenna 110. The one or more radio signals are transmitted by other communication systems 103. The receiver module 232 processes a received radio signal by demodulating and/or decoding the received radio signal. The receiver module 232 then determines usable information based at least in part on the processed radio signal. The receiver module 232 generates incoming data using the usable information. For example, incoming data indicates one or more of a traffic condition, a safety warning, a road condition, a status and/or an action of a vehicle, etc.

In one embodiment, the receiver module 232 eliminates one or more interference signals from received signals. For example, the received signals include one or more interference signals and a desired signal. The one or more interference signals fall into a signal subspace that is different from the signal subspace of the desired signal. Therefore the receiver module 232 easily differentiates between the one or more interference signals and the desired signal. The receiver module 232 then removes the one or more interference signals from the received signals. For example, the receiver module 232 removes the one or more interference signals from the received signals by filtering all signals in the signal subspace where the one or more interference signals are. The receiver module 232 then obtains the desired signal. In one embodiment, the receiver module 232 generates incoming data based on the desired signal.

In one embodiment, the receiver module 232 sends incoming data to the control unit 202. The control unit 202 delivers the incoming data to the storage device 240 for storage. In one embodiment, the control unit 202 displays incoming data on the interface 212 for a user 125. For example, incoming data indicates that a car is stuck in the intersection ahead. The control unit 202 displays the incoming data as a message saying "A car is stuck in the intersection ahead" on the interface 212 for the user 125 such as a driver.

The transmitter module 234 is code and routines for generating one or more transmission signals. For example, the transmitter module 234 generates radio signals. The transmitter module 234 sends the radio signals to the antenna 110 for transmitting the radio signals to the network 105. In one embodiment, the transmitter module 234 is implemented using hardware such as field-programmable gate array (FPGA) or an application-specific integrated circuit (ASIC). In another embodiment, the transmitter module 234 is implemented using a combination of hardware and software.

In one embodiment, the transmitter module 234 generates one or more transmission signals based on source data. For example, the transmitter module 234 receives source data from the control unit 202. The transmitter module 234 processes the source data by modulating and/or encoding the source data. The transmitter module 234 then generates one or more transmission signals based on the processed source data. The transmitter module 234 sends the one or more transmission signals to the network 105 through the antenna 110. In one embodiment, the transmitter module 234 also sends the one or more transmission signals to the storage device 240 for storage via the control unit 202.

In one embodiment, the transmitter module 234 determines one or more associated Interference Alignment (IA) groups. For example, an IA group is composed of one or more transmitting communication systems 103 that are within an interference area for a receiving communication system 103. The interference area is defined by an interference threshold range. The IA group that the transmitting communication system 103 (including the transmitter module 234) belongs to is an associated IA group for the transmitting communication system 103. Therefore, in one embodiment, the transmitter module 234 determines an associated IA group by detecting an IA group that the transmitting communication system 103 (including the transmitter module 234) belongs to. For purposes of clarity and convenience, the present description might occasionally omit mentioning the transmitting communication system 103. For example, the above scenario will be described as the transmitter module 234 detecting one or more IA groups that the transmitter module 234 belongs to.

In one embodiment, the transmitter module 234 determines one or more requirements for the one or more associated IA groups. For example, the requirement for an associated IA group is a constraint condition to realize IA control so that all interference signals will fall into a signal subspace different from that of a desired signal.

In one embodiment, the transmitter module 234 calculates one or more precoding vectors based at least in part on the one or more requirements for the one or more associated IA groups. For example, a precoding vector includes one or more weights for plural signals. In one embodiment, the transmitter module 234 generates one or more transmission signals based at least in part on the one or more precoding vectors and the source data. For example, the transmitter module 234 multiplies a precoding vector to the source data to generate one or more transmission signals.

The transmitter module 234 is described below in more detail with reference to FIG. 3.

The sensor 231 is any type of conventional sensor configured to collect any type of data. For example, the sensor 231 is one of the following: a light detection and ranging (LIDAR) sensor; an infrared detector; a motion detector; a thermostat; and a sound detector, etc. Persons having ordinary skill in the art will recognize that other types of sensors are possible. In one embodiment, the sensor 231 measures a condition related to a vehicle. The sensor 231 generates a sensor signal describing the condition based on the measurement. For example, the sensor 231 measures one of a steering angle, a brake angle, a velocity, an acceleration and/or deceleration of a vehicle, a temperature inside a vehicle, whether fog lights are on and whether windshield wipers are activated, etc. The sensor 231 generates a sensor signal describing the measurement. In another embodiment, the sensor 231 measures a condition in an environment that is external to the vehicle and generates a sensor signal describing the measurement. For example, the sensor 231 measures a percentage of humidity in an environment and generates a sensor signal describing the measurement. The sensor 231 sends the sensor signal to the control unit 202.

In one embodiment, the communication node 101 includes a combination of different types of sensors 231. For example, the communication node 101 includes a first sensor 231 for monitoring a steering angle of a steering device in a vehicle, a second sensor 231 for monitoring a velocity of the vehicle and a third sensor 231 for monitoring a brake angle of a brake device in the vehicle.

In one embodiment, the communication node 101 also includes a camera (not pictured) coupled to the control unit 202. The camera is an optical device for recording images. For example, the camera takes pictures of roads, traffic lights, vehicles, pedestrians crossing the road, etc., external to a vehicle as the vehicle is driven down a road. In one embodiment, the camera captures images and stores the images in the storage device 240 as sensor data. In one embodiment, the camera is mounted in the front of a vehicle. In other embodiments, the camera is mounted on other portions of the vehicle. In one embodiment, the camera is configured to capture a video including successive frames that describe an environment surrounding a road when a driver is driving a vehicle on the road. The camera sends the images to the control unit 202. The control unit 202 then determines source data (such as traffic and safety information) based at least in part on the images.

The interface 212 is a device configured to handle communications between the user 125 and the control unit 202. For example, the interface 212 includes one or more of an in-vehicle touch screen for receiving inputs from the user 125 and a microphone for capturing voice inputs from the user 125. The interface 212 sends the inputs from the user 125 to the control unit 202. In one embodiment, the interface 212 is configured to transmit an output from the control unit 202 to the user 125. For example, the interface 212 includes an audio system for playing a voice prompt to the user 125 indicating a safety warning. In other examples, the interface 212 includes a display device for displaying a road condition to the user 125. One having ordinary skill in the art will recognize that the interface 212 may include other types of devices for providing the functionality described herein.

The user 125a is a human user. In one embodiment, the user 125a is a driver driving a vehicle on a road. The user 125a interacts with, or otherwise provides an input to, an interface 212, which sends and receives different types of data to and from the control unit 202. For example, the interface 212 is a touch screen and the user 125a touches a portion of the touch screen with a finger or a stylus to provide an input.

The storage device 240 is a non-transitory memory that stores data. For example, the storage device 240 is a dynamic random access memory (DRAM) device, a static random access memory (SRAM) device, flash memory or some other memory device known in the art. In one embodiment, the storage device 240 also includes a non-volatile memory or similar permanent storage device and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device known in the art. The storage device 240 is described below in more detail with reference to FIG. 4.

Transmitter Module 234

Figure 3:
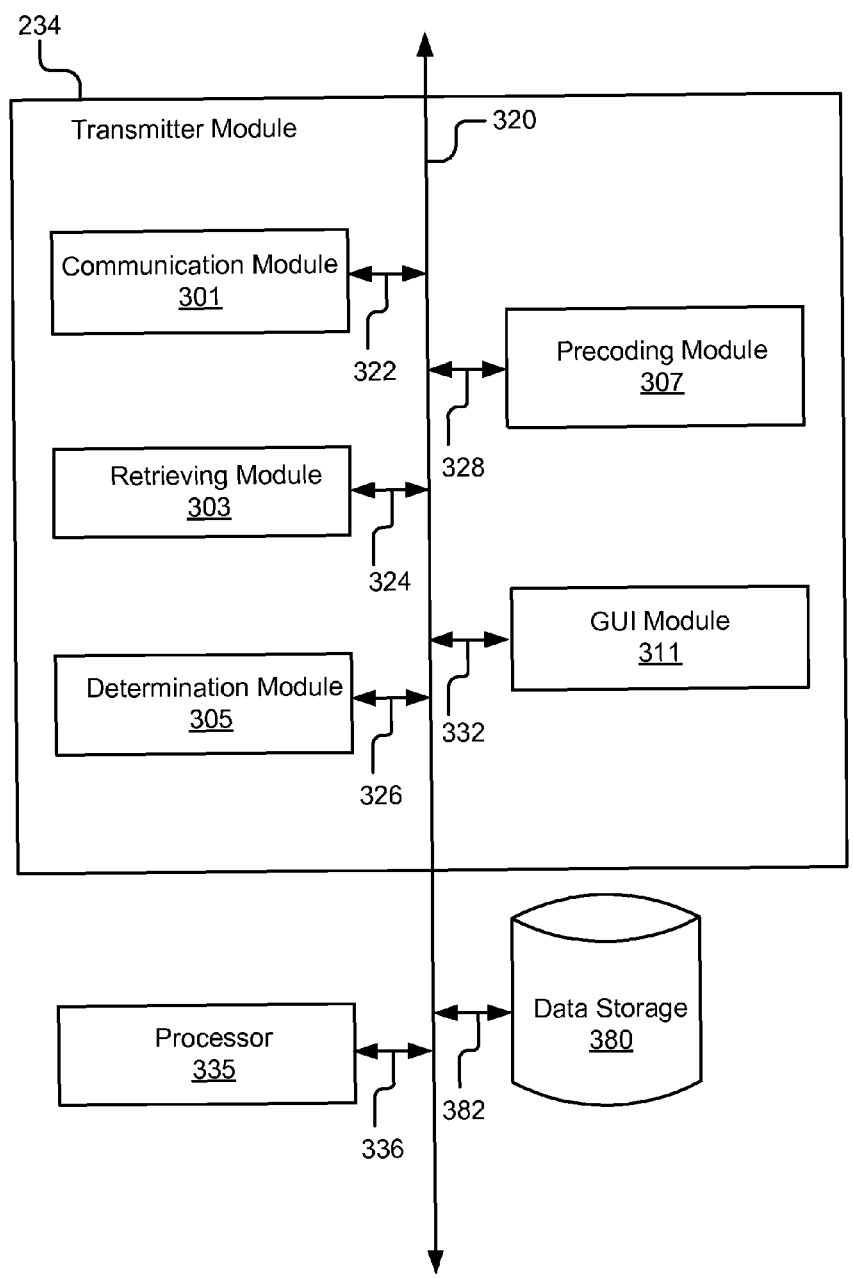
FIG. 3 is a block diagram illustrating a transmitter module according to one embodiment.

Referring now to FIG. 3, a transmitter module 234 is shown in more detail. FIG. 3 is a block diagram illustrating a transmitter module 234 according to one embodiment. The transmitter module 234 comprises a communication module 301, a retrieving module 303, a determination module 305, a precoding module 307 and a graphical user interface (GUI) module 311. These components of the transmitter module 234 are communicatively coupled to a bus 320 for communication with one another. In the illustrated embodiment, a processor 335 is communicatively coupled to the bus 320 via signal line 336. A data storage 380 is communicatively coupled to the bus 320 via signal line 382.

The processor 335 comprises an arithmetic logic unit, a microprocessor, a general purpose controller or some other processor array to perform computations, retrieve data stored on the data storage 380, etc. Processor 335 processes data signals and may comprise various computing architectures including a complex instruction set computer (CISC) architecture, a reduced instruction set computer (RISC) architecture, or an architecture implementing a combination of instruction sets. The processing capability of the processor 335 may be limited to supporting the retrieval of data and transmission of data. The processing capability of the processor might be enough to perform more complex tasks, including various types of modulating, encoding and multiplexing. It will be obvious to one skilled in the art that other processors, operating systems, sensors, displays and physical configurations are possible.

The data storage 380 is a non-transitory storage medium. For example, the data storage 380 is any memory. The data storage 380 stores data necessary for the transmitter module 234 to perform its function. For example, the data storage 380 stores source data received from the control unit 202 for storage or buffering. In another example, the data storage 380 stores one or more transmission signals received from the precoding module 307 for storage or buffering.

The communication module 301 is code and routines for handling communication between components of the transmitter module 234 and other components of the communication node 101. For example, the communication module 301 receives a request for source data from the retrieving module 303. The communication module 301 sends the request for source data to the control unit 202. In another example, the communication module 301 receives source data from the control unit 202. The communication module 201 delivers the source data to the retrieving module 303. The communication module 301 is communicatively coupled to the bus 320 via signal line 322.

In one embodiment, the communication module 301 receives one or more transmission signals from the precoding module 307. The communication module 301 delivers the one or more transmission signals to the antenna 110. The antenna 110 sends the one or more transmission signals to the network 105. In one embodiment, the communication module 301 amplifies the one or more transmission signals before delivering them to the antenna 110. For example, the communication module 301 amplifies a transmission signal using conventional amplifying techniques.

In another embodiment, the communication module 301 receives graphical data from the GUI module 311. The communication module 311 sends the graphical data to the interface 212 via the control unit 202 for displaying information to a user 125. For example, the graphical data is used to generate a user interface for displaying transmitted source data (e.g., a safety warning, traffic information, a road condition, a status and/or an action of the vehicle, etc.) to the user 125.

In one embodiment, the communication module 301 receives data from other components of the transmitter module 234. The communication module 301 stores the data in the storage device 240 via the control unit 202. For example, the communication module 301 receives data describing one or more requirements for one or more associated IA groups from the determination module 305. The communication module 301 stores the data describing one or more requirements for one or more associated IA groups in the storage device 240 via the control unit 202. In another example, the communication module 301 receives one or more precoding vectors and one or more transmission signals from the precoding module 307. The communication module 301 stores the one or more precoding vectors and one or more transmission signals in the storage device 240 via the control unit 202.

In one embodiment, the communication module 301 also handles the communications between other sub-modules 303, 305, 307 and 311 in the transmitter module 234. For example, the communication module 301 communicates with the determination module 305 and the precoding module 307 to pass the output of the determination module 305 (such as data describing one or more requirements for one or more associated IA groups) to the precoding module 307. However, this description may occasionally omit mention of the communication module 301 for purposes of clarity and convenience. For example, for purposes of clarity and convenience, the above scenario may be described as the determination module 305 passing data describing one or more requirements for one or more associated IA groups to the precoding module 307.

The retrieving module 303 is code and routines for retrieving data. In one embodiment, the retrieving module 303 retrieves data from the storage device 240 via the control unit 202. The retrieving module 303 sends the data to other components of the transmitter module 234. In one embodiment, the retrieving module 303 also sends the data to the data storage 380 for storage or for buffering. The retrieving module 303 is communicatively coupled to the bus 320 via signal line 324.

In one embodiment, the retrieving module 303 generates a request for source data. For example, the retrieving module 303 generates a request for source data describing the most current traffic information. In another example, the retrieving module 303 generates a request for source data indicating a safety warning. In one embodiment, the retrieving module 303 sends the request for source data to the control unit 202 via the communication module 301. The control unit 202 retrieves the source data from the storage device 240. The control unit 202 delivers the source data to the retrieving module 303 via the communication module 301. The retrieving module 303 sends the source data to the precoding module 307.

In another embodiment, the retrieving module 303 generates a request for one or more transmission signals. The retrieving module 303 sends the request to the control unit 202. The control unit 202 retrieves one or more transmission signals from the storage device 240. The control unit 202 delivers the one or more transmission signals to the retrieving module 303 via the communication module 301. The retrieving module 303 sends the one or more transmission signals to the antenna 110 for transmission.

In one embodiment, the retrieving module 303 sends a request for data periodically. For example, the retrieving module 303 sends a request for source data to the control unit 202 in a pre-determined time interval such as one second, five seconds, 30 seconds, one minute, five minutes, etc. In another embodiment, the retrieving module 303 retrieves data when the data is generated. For example, the retrieving module 303 retrieves source data when the source data is generated and stored by the control unit 202. For example, the control unit 202 generates sensor data based at least in part on one or more sensor signals from the sensor 231. The control unit 202 then generates source data based on the sensor data. For example, the source data indicates a road condition. The control unit 202 then transmits the source data to the storage device 240 for storage. The control unit 202 also sends the source data to the retrieving module 303.

The determination module 305 is code and routines for determining one or more requirements for one or more associated IA groups. For example, the determination module 305 determines one or more associated IA groups by detecting one or more IA groups that the transmitter module 234 (including the determination module 305) belongs to. The determination module 305 then determines one or more requirements for the one or more associated IA groups. The determination module 305 is communicatively coupled to the bus 320 via signal line 326.

In one embodiment, the determination module 305 determines one or more associated IA groups based at least in part on an interference threshold range. For example, the determination module 305 retrieves sensor data from the storage device 240 via the control unit 202. The sensor data describes a measurement of distance between the transmitting communication system 103 (including the transmitter module 234 that includes the determination module 305) and a receiving communication system 103. The determination module 305 compares the measurement of distance with an interference threshold range. For example, the interference threshold range is from 50 meters to 100 meters. In another example, the interference threshold range is from 50 meters to hundreds of meters. If the measurement of distance is no larger than the interference threshold range, then the determination module 305 determines that the transmitting communication system 103 (including the transmitter module 234 that includes the determination module 305) belongs to an IA group for the receiving communication system 103. The IA group is an associated IA group for the transmitting communication system 103 (including the transmitter module 234 that includes the determination module 305). Similarly, the determination module 305 can determine other associated IA groups for the transmitting communication system 103.

In another embodiment, the determination module 305 determines one or more associated IA groups based at least in part on a predetermined control method. For example, the determination module 305 receives sensor data from the storage device 240 via the control unit 202. The sensor data is used as one or more parameters for the predetermined control method. For example, the one or more parameters include a velocity of the vehicle, a temperature, humidity, an environment condition, etc. The determination module 305 determines one or more IA associated groups using the predetermined control method based on the one or more parameters.

In one embodiment, once determining one or more associated IA groups, the determination module 305 determines one or more requirements for the one or more associated IA groups. The determination module 305 generates data describing the one or more requirements for the one or more associated IA groups. For example, a requirement is a constraint condition for an associated IA group to realize IA control so that each interference signal falls in to a signal subspace different from that of one or more desired signals at the receiving communication system 103. The interference signal therefore can be easily eliminated by the receiving communication system 103. In one embodiment, the determination module 305 determines all requirements for all associated IA groups. One or more transmission signals are controlled to meet the all requirements to realize IA control.

The interference signal is a type of signal not desired by the receiving communication system 103. In one embodiment, a signal from outside a communication area for a receiving communication system 103 is an interference signal for the receiving communication system 103. In other embodiments, a signal from outside the communication area is a type of signal different from an interference signal. A desired signal is a signal from inside a communication area for a receiving communication system 103. For example, the communication area is a circle area with the receiving communication system 103 being at the center of the circle area. The radius of the circle area is between 0-50 meters.

In one embodiment, the determination module 305 determines one or more requirements for the one or more associated IA groups using some predetermined methods. For example, the predetermined methods are based on previous experiences. The determination module 305 generates data describing the one or more requirements for the one or more associated IA groups by applying the predetermined methods.

In one embodiment, the determination module 305 sends data describing one or more requirements for one or more associated IA groups to the precoding module 307. In another embodiment, the determination module 305 also sends data describing one or more requirements for one or more associated IA groups to the storage device 240 for storage. In yet another embodiment, the determination module 305 sends data describing one or more requirements for one or more associated IA groups to the data storage 308 for storage or for buffering.

The precoding module 307 is code and routines for generating one or more precoding vectors and generating one or more transmission signals. For example, the precoding module 307 calculates one or more precoding vectors based at least in part on data describing one or more requirements for one or more associated IA groups. The precoding module 307 generates one or more transmission signals using the one or more precoding vectors and source data. The precoding module 307 sends the one or more transmission signals to the antenna 110 for transmission via the communication module 301. In one embodiment, the precoding module 307 also sends the one or more transmission signals to the storage device 240 for storage via the control unit 202. In another embodiment, the precoding module 307 also sends the one or more transmission signals to the data storage 380 for storage or for buffering. The precoding module 307 is communicatively coupled to the bus 320 via signal line 328.

In one embodiment, the precoding module 307 receives data describing one or more requirements for one or more associated IA groups from the determination module 305. The precoding module 307 calculates one or more precoding vectors based at least in part on the data describing one or more requirements for one or more associated IA groups. For example, the precoding module 307 calculates a precoding vector including one or more precoding weights. The precoding vector is used to control one or more transmission signals in such a way as to align one or more received signals at the receiving communication system 103. In one embodiment, the precoding module 307 calculates one or more precoding vectors based on data describing all requirements for all associated IA groups.

In one embodiment, the precoding module 307 generates one or more transmission signals based at least in part on one or more precoding vectors and source data. For example, the precoding module 307 receives source data from the retrieving module 303. The precoding module 307 multiplies one or more precoding vectors to the source data to generate one or more transmission signals. The precoding module 307 sends the one or more transmission signals to the antenna 110 for transmission. In this way, the one or more transmission signals are controlled to realize IA at the receiving communication system 103.

In one embodiment, a receiving communication system 103 receives one or more transmission signals that are controlled by one or more transmitting communication systems 103 when transmitting. The one or more transmission signals can be interference signals or desired signals for the receiving communication system 103.

In one embodiment, at the receiving communication system 103, each interference signal is aligned into one signal subspace different from the signal subspace where one or more desired signals are. For example, two or more interference signals are in the same subspace different from the subspace where a desired signal is. In other embodiments, at the receiving communication system 103, two or more interference signals are in different subspaces, but close to each other. For example, the two or more interference signals are close to each other in the sense of space distance or in the sense of correlation. The two or more interference signals occupy two or more subspaces that are all different from the subspace where the desired signal is. Therefore the receiving communication system 103 can easily remove the two or more interference signals.

In one embodiment, the precoding module 307 controls one or more transmission signals to arrive at a receiving communication system 103 synchronously with other transmission signals from other transmitting communication systems 103. For example, all transmitting communication systems 103 (each including a transmitter module 234 that includes a precoding module 307) in the same IA group sends transmission signals time-synchronously to meet the requirement of the IA group. In this way, all transmitting communication systems 103 in the same IA group control their transmission signals to arrive at a receiving communication system 103 synchronously. In other examples, all transmitting communication systems 103 in the same IA group control their transmission signals in other cooperative ways to arrive at a receiving communication system 103 synchronously.

The GUI module 311 is code and routines for providing graphical data for a user 125. The GUI module 311 is communicatively coupled to the bus 320 via signal line 332. In one embodiment, the GUI module 311 generates graphical data for depicting a user interface to notify a user 125 that source data is transmitted. For example, source data indicates a safety warning such as, "there is ice on the road." The graphical data is used to generate a user interface for displaying that the safety warning is transmitted to the user 125 as, "A warning of 'there is ice on the road' is transmitted." In other embodiments, the GUI module 311 generates graphical data for depicting a user interface via which a user 125 inputs information to the communication system 103. The GUI module 311 sends the generated graphical data to the interface 212, causing the interface 212 to present the user interface to the user 125.

Storage Device 240

Figure 4:
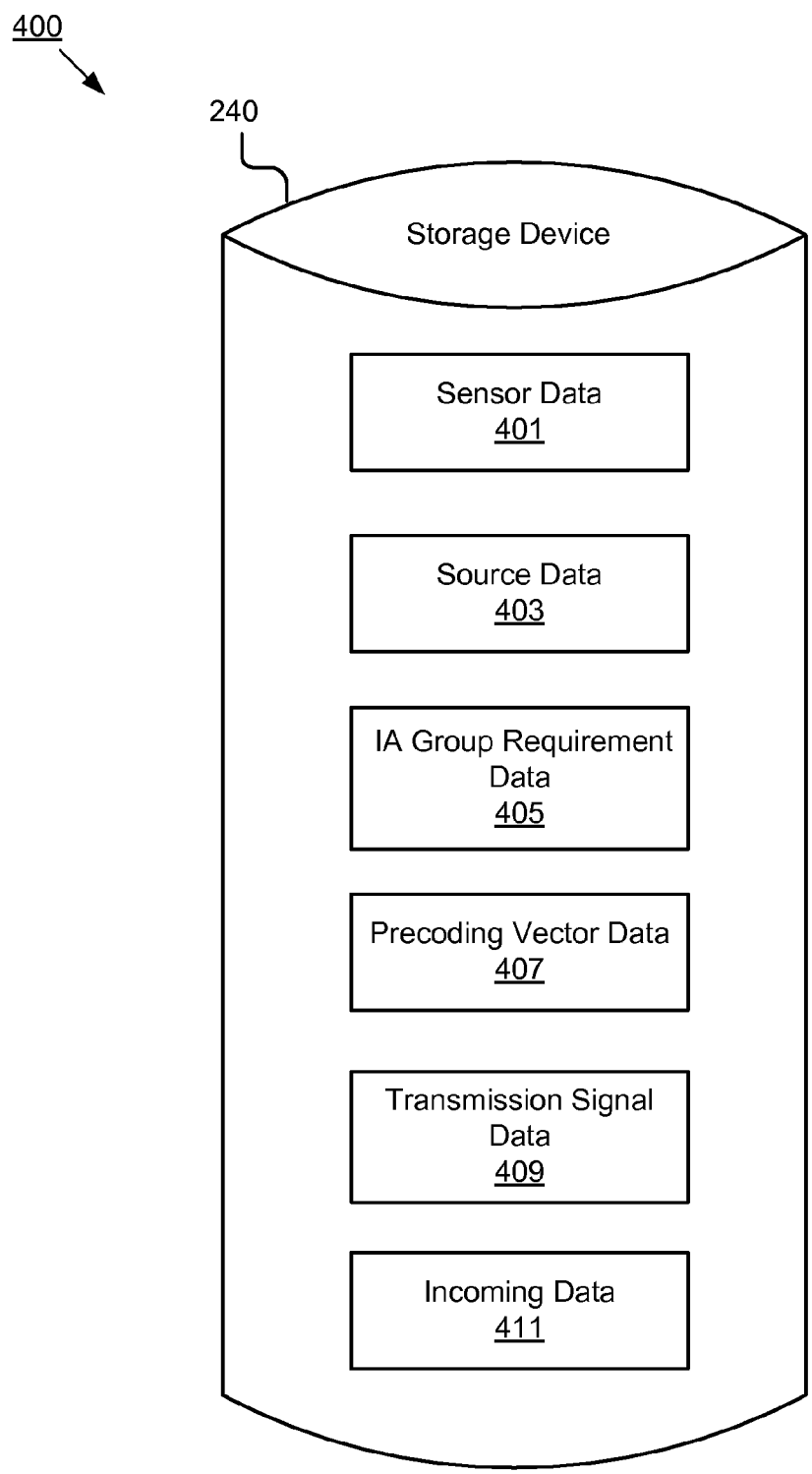
FIG. 4 is a block diagram illustrating a storage device according to one embodiment.

FIG. 4 is a block diagram 400 illustrating a storage device 240 according to one embodiment. The storage device 240 includes sensor data 401, source data 403, IA group requirement data 405, precoding vector data 407, transmission signal data 409 and incoming data 411. One skilled in the art will recognize that the storage device 240 may include other data for providing the functionality described herein.

The sensor data 401 is data generated by the control unit 202 based on one or more sensor signals from the sensor 231. For example, the sensor data 401 includes one or more of brake data, velocity data, steering data, wiper data, light data and temperature data, etc. The sensor data 401 also includes one or more environmental factors associated with the vehicle. The one or more environment factors include weather data, road type data, traffic data and scene type data, etc. In another example, the sensor data 401 also includes one or more images received from the camera coupled to the control unit 202.

The source data 403 is data generated by the control unit 202 based on the sensor data 401. The source data is used to generate transmission data. For example, the source data 403 includes data describing one or more of a traffic condition, a safety warning, a road condition, a status and/or an action of a vehicle and any other information useful to other vehicles.

The IA group requirement data 405 is data describing one or more requirements for one or more associated IA groups. For example, a requirement is a constraint condition for an associated IA group to realize IA control.

The precoding vector data 407 includes one or more precoding vectors. For example, a precoding vector includes one or more precoding weights. The precoding vectors are used to generate one or more transmission signals that are received aligned at receiving communication systems 103.

The transmission signal data 409 includes one or more transmission signals. For example, one or more transmission signals are generated based on one or more precoding vectors and source data. The precoding module 307 generates one or more transmission signals by multiplying one or more precoding vectors to the source data. The precoding module 307 sends the one or more transmission signals to the storage device 240 for storage.

The incoming data 411 is data generated by the receiver module 232 based on signals from other communication systems 103. For example, the receiver module 232 receives one or more signals from other communication systems 103. The receiver module 232 processes the one or more signals and determines usable information based on the one or more signals. The receiver module 232 generates incoming data using the usable information. The receiver module 232 stores the incoming data in the storage device 240 via the control unit 202. For example, incoming data includes one or more of a traffic condition, a safety warning, a road condition, a status and/or an action of a vehicle, etc.

Methods

Figure 5:
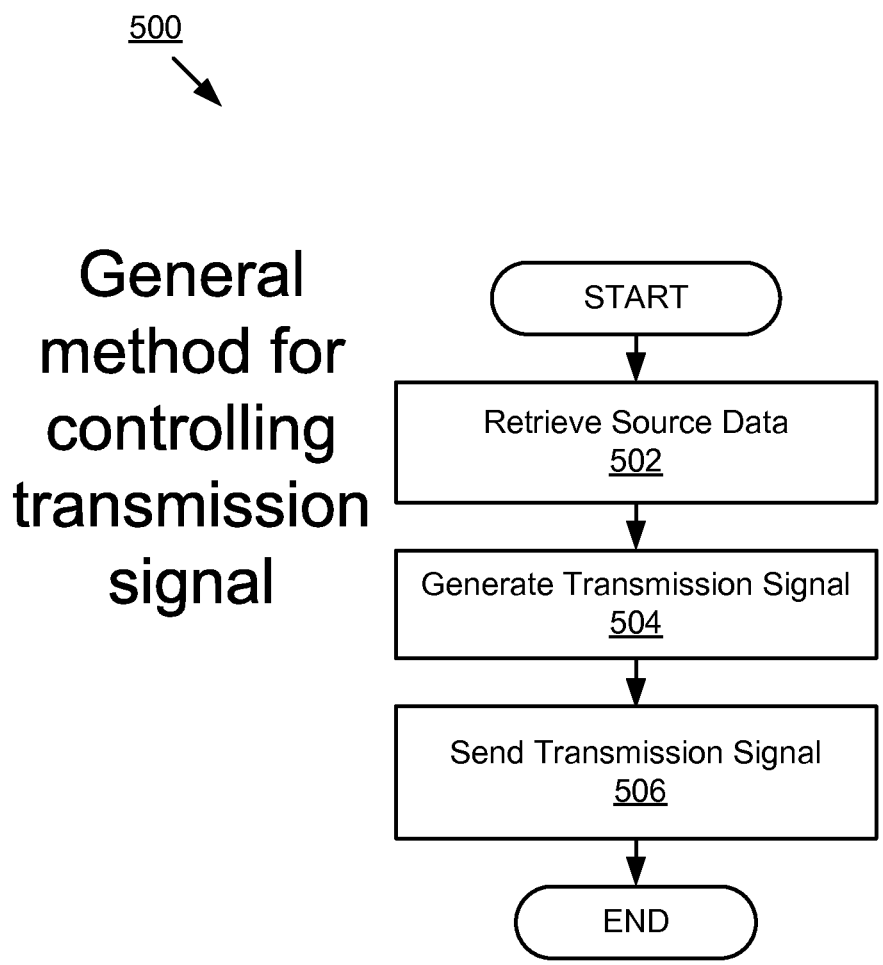
FIG. 5 is a flow diagram illustrating a method for controlling transmission signals according to one embodiment.
Figure 6:
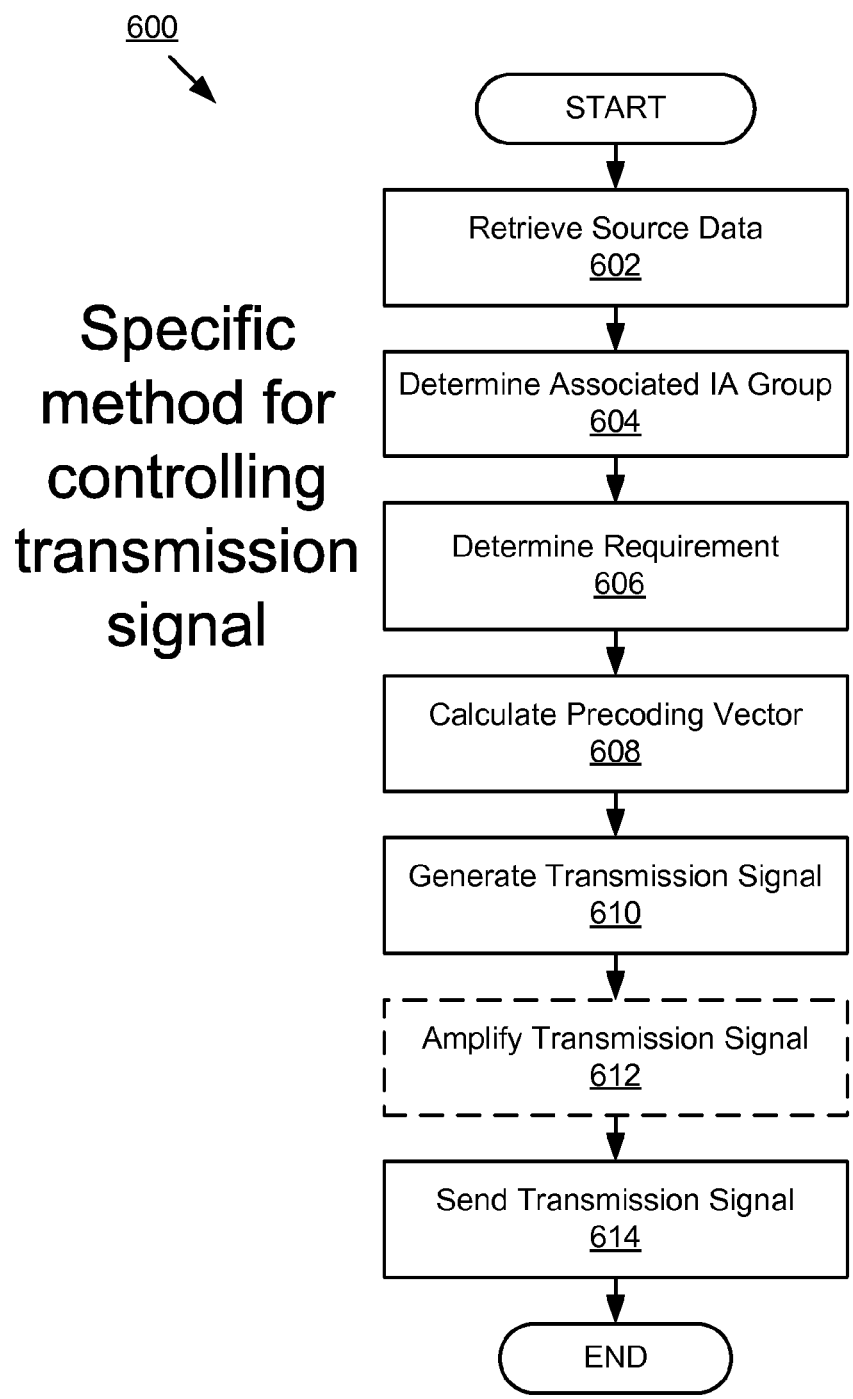
FIG. 6 is a flow diagram illustrating a method for controlling transmission signals according to another embodiment.
Figure 7:
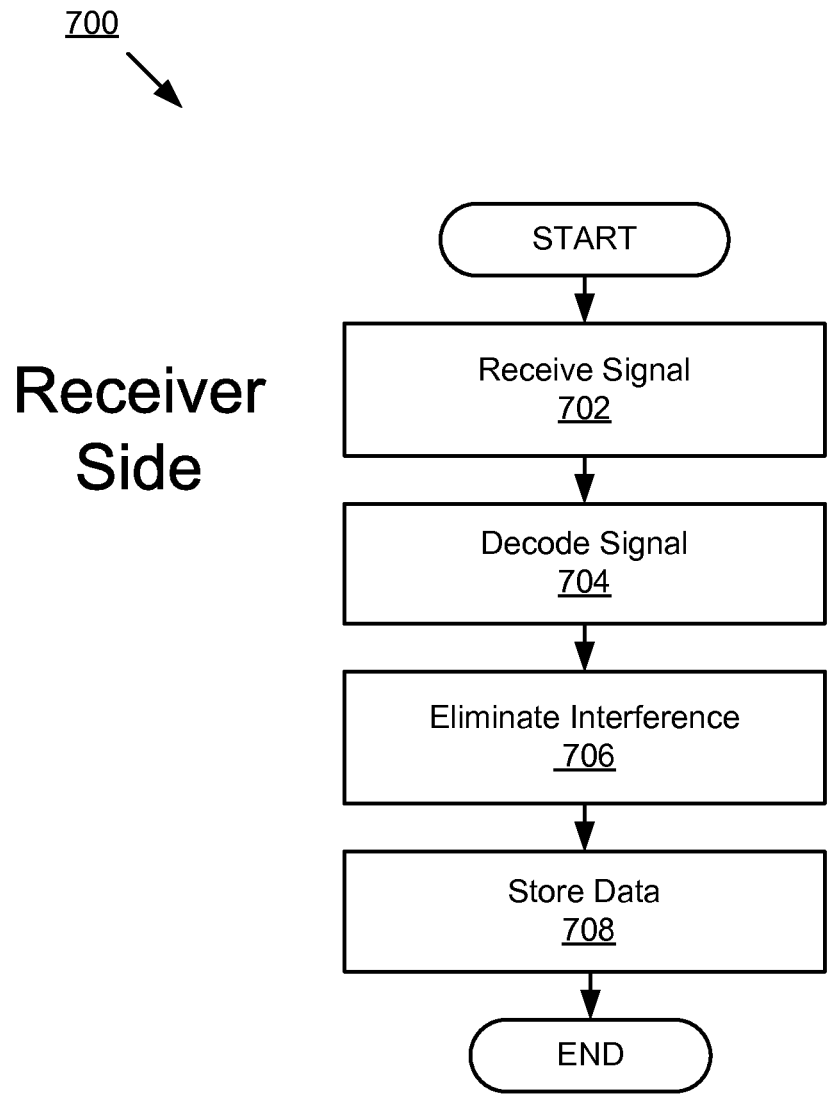
FIG. 7 is a flow diagram illustrating a method for eliminating interference according to one embodiment.

Referring now to FIGS. 5-7, various embodiments of the method of the specification will be described.

FIG. 5 is a flow diagram illustrating a method 500 for controlling a transmission signal according to one embodiment. The retrieving module 303 retrieves 502 source data. The source data is generated based on sensor data. For example, the source data includes one or more of a traffic condition, a safety warning, etc. In one embodiment, the retrieving module 303 generates a request for source data. The retrieving module 303 transmits the request for source data to the control unit 202 via the communication module 301. The control unit 202 retrieves the source data from the storage device 240 and delivers the source data to the retrieving module 303.

At step 504, the precoding module 307 generates a transmission signal. In one embodiment, the precoding module 307 receives source data from the retrieving module 303. The precoding module 307 receives data describing one or more requirements for one or more associated IA groups from the determination module 305. Then the precoding module 307 calculates one or more precoding vectors based at least in part on the data describing one or more requirements for one or more associated IA groups. The precoding module 307 generates one or more transmission signals based at least in part on the source data and the one or more precoding vectors. For example, the precoding module 307 multiplies the one or more precoding vectors to the source data to generate the one or more transmission signals.

At step 506, the precoding module 307 sends a transmission signal. For example, the precoding module 307 sends one or more transmission signals to the antenna 110. The antenna 110 sends the one or more transmission signals to the network 105. One or more other communication systems 103 coupled to the network 105 can receive the one or more transmission signals.

FIG. 6 is a flow diagram illustrating a method 600 for controlling transmission signals according to another embodiment. The retrieving module 303 retrieves 602 source data. In one embodiment, the retrieving module 303 retrieves source data from the storage device 240 via the control unit 202. The source data includes one or more of a traffic condition, a safety warning, etc.

At step 604, the determination module 305 determines the associated IA group. An associated IA group is an IA group that the transmitter module 234 (including the determination module 305) belongs to. In one embodiment, the determination module 305 determines one or more associated IA groups based at least in part on an interference threshold range. For example, the determination module 305 compares distances between the transmitting communication system 103 (including the transmitter module 234 that includes the determination module 305) and other communication systems 103 with an interference threshold range such as 80 meters. Then the determination module 305 determines one or more associated IA groups based on the comparison. In another embodiment, the determination module 305 determines one or more associated IA groups based at least in part on a predetermined control method. The determination module 305 calls the predetermined control method using one or more parameters as input. For example, the one or more parameters include sensor data from the storage device 240. Then the determination module 305 determines one or more associated IA groups according to the output of the call.

At step 606, the determination module 305 determines requirement. For example, the determination module 305 determines one or more requirements for one or more associated IA groups. For example, a requirement is a constraint condition for an associated IA group to realize IA control. The determination module 305 generates data describing the one or more requirements for one or more associated IA groups.

At step 608, the precoding module 307 calculates precoding vector. In one embodiment, the precoding module 307 calculates one or more precoding vectors based at least in part on the data describing one or more requirements for one or more associated IA groups. For example, the precoding module 307 calculates a precoding vector including one or more precoding weights. The precoding weights are used to control one or more transmission signals to arrive aligned at a receiving communication system 103.

At step 610, the precoding module 307 generates transmission signals. In one embodiment, the precoding module 307 generates one or more transmission signals based at least in part on the one or more precoding vectors and source data. For example, the precoding module 307 multiplies the one or more precoding vectors to the source data to generate one or more transmission signals.

At step 612, the communication module 301 amplifies transmission signals. For example, the communication module 301 receives one or more transmission signals from the precoding module 307. The communication module 301 amplifies the one or more transmission signals using digital amplifying techniques. The step 612 is depicted in FIG. 6 using a dotted line to indicate that the step 612 is an optional step for the method 600.

At step 614, the communication module 301 sends transmission signals. For example, the communication module 301 sends one or more transmission signals to the antenna 110. The antenna 110 sends the one or more transmission signals to the network 105. Through the network 105, other communication systems 103 coupled to the network 105 can receives the one or more transmission signals.

FIG. 7 is a flow diagram illustrating a method 700 for eliminating interference according to one embodiment. The receiver module 232 receives 702 one or more signals. In one embodiment, the receiver module 232 receives one or more signals from the network 105 via the antenna 110. For example, the one or more received signals are one or more transmission signals from other communication systems 103 coupled to the network 105.

The receiver module 232 decodes 704 one or more signals and eliminates 706 one or more interference signals. For example, the receiver module 232 decodes the received transmission signals. Since the received transmission signals were processed by transmitter modules 234 in transmitting communication systems 103 using one or more precoding vectors, the received transmission signals are aligned at the receiving communication system 103 (including the receiver module 232). Therefore, all interference signals in the received transmission signals are in the same signal subspace different from that of one or more desired signals. The receiver module 232 eliminates all interference signals from the received transmission signals by deleting all signals in the same signal subspace where the interference signals are.

The receiver module 232 stores 708 data. For example, after eliminating interference signals from received signals, the receiver module 232 obtains one or more desired signals. The receiver module 232 then determines usable information based on the one or more desired signals. The receiver module 232 generates incoming data using the usable information. The receiver module 232 sends the incoming data to the storage device 240 via the control unit 202. The storage device 240 stores the incoming data.

Graphic Representations

FIG. 8A-8D are graphic representations illustrating a communication scenario where the distributed interference alignment is realized using the method described in the present specification according to one embodiment.

Figure 8A:
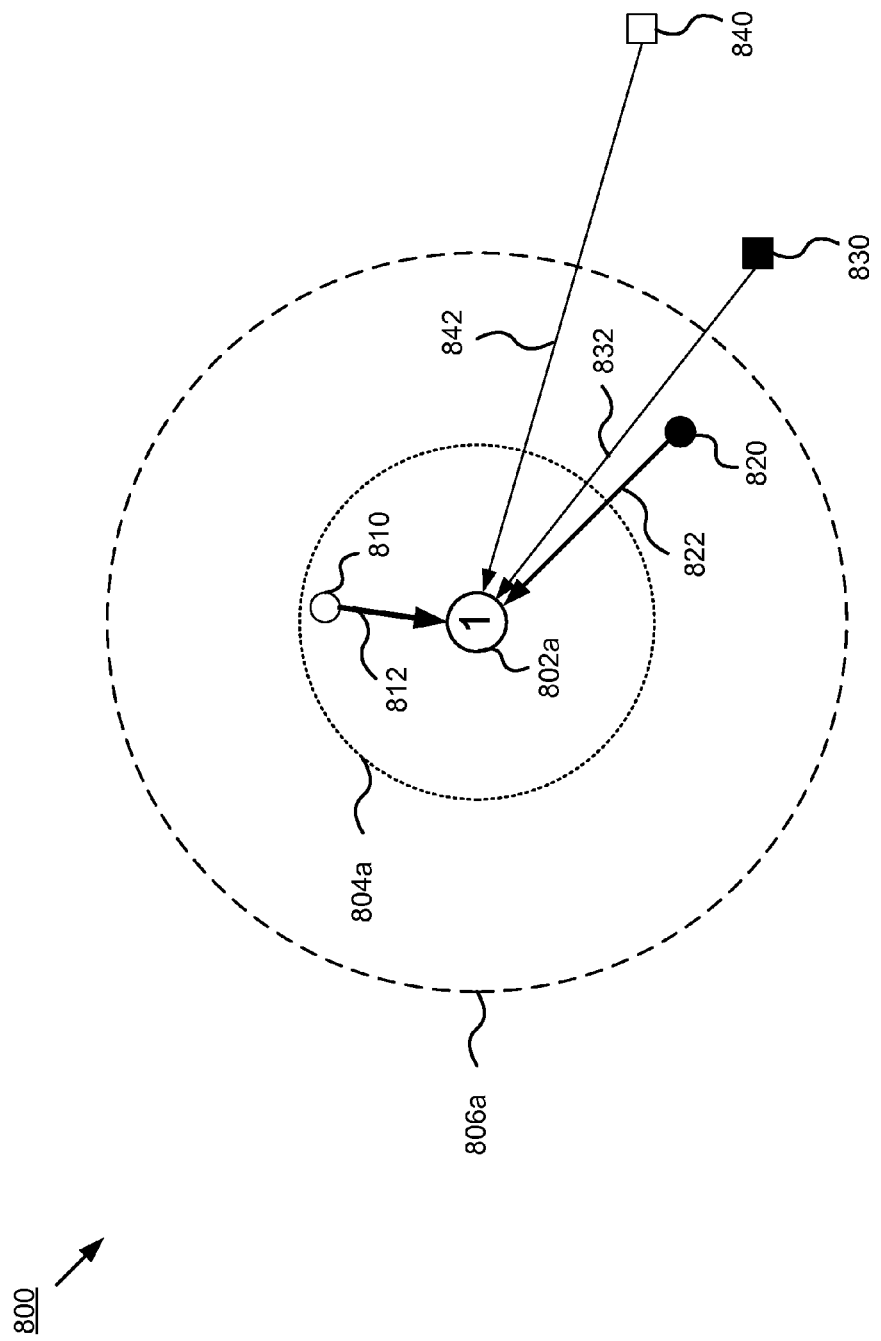
FIGS. 8A-8D are graphic representations illustrating a communication scenario where the distributed interference alignment is realized using the method described in the present specification according to one embodiment.

Referring to FIG. 8A, depicted is graphic representation 800 illustrating a communication scenario where the distributed interference alignment is realized using an embodiment described herein. Element 802a is a graphic representation for a receiving communication system 802a. For example, the receiving communication system 802a is a communication system 103 described above in detail with reference to FIGS. 1-3. Element 804a is a graphic representation for a communication area 804a for the receiving communication system 802a. In the depicted embodiment, the communication area 804a is a circle around the receiving communication system 802a. For example, the radius of the circle is between 0-50 meters. In one embodiment, a signal from outside the communication area 804a is an interference signal.

Element 806a is a graphic representation for an IA group area 806a for the receiving communication system 802a. The IA group area 806a is defined by an interference threshold range. For example, the interference threshold range is from 50 meters to 100 meters. In the depicted embodiment, the IA group area 806a is a circle with a radius equaling to the interference threshold range. In one embodiment, a signal from outside the IA group area 806a is an interference signal that needs not be cancelled purposely, but is unaffected because of the long distance to the receiving communication system 802a.

Element 810 is a graphic representation for a transmitting communication system 810. For example, the transmitting communication system 810 is a communication system 103 described above in detail with reference to FIGS. 1-3. Element 812 is a graphic representation for a transmission signal 812 transmitted from the transmitting communication system 810 to the receiving communication system 802a. For example, the transmission signal 812 is a desired signal for the receiving communication system 802a since the transmitting communication system 810 is within the communication area 804a for the receiving communication system 802a. The transmission signal 812 is controlled by the transmitting communication system 810 to be in a different signal subspace from that of one or more interference signals at the receiving communication system 802a.

Element 820, 830, 840 are graphic representations for transmitting communication systems 820, 830, 840. For example, the transmitting communication systems 820, 830, 840 are communication systems 103 described above in detail with reference to FIGS. 1-3. Element 822, 832, 842 are transmission signals from the transmitting communication systems 820, 830, 840 to the receiving communication system 802a.

In the depicted embodiment, the transmission signal 822 is from outside the communication area 804a and inside the IA group area 806a. The transmission signal 822 is controlled when transmitted by the transmitting communication system 820 to be aligned at the receiving communication system 802a. That is, the transmission signal 822 is in a different signal subspace from that of the transmission signal 812 at the receiving communication system 802a. The transmission signals 832, 842 are from outside the IA group area 806a. Therefore the transmission signals 832, 842 are neither controlled by the transmitting communication systems 830, 840, respectively to be aligned nor cancelled by the receiving communication system 802a.

In summary, the transmitting communication systems 810, 820 control their transmission signals 812, 822 respectively for IA.

Figure 8B:
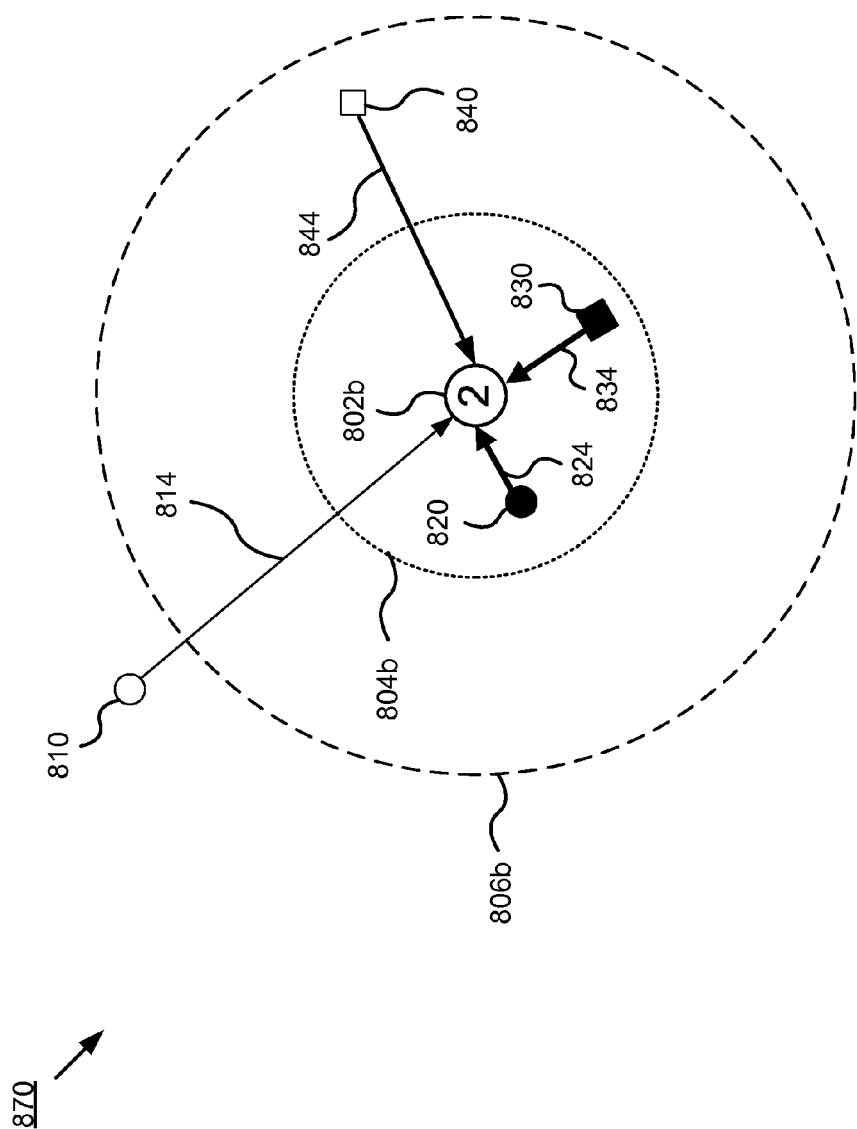

Referring to FIG. 8B, depicted is graphic representations 870 illustrating a communication scenario where the distributed interference alignment is realized using an embodiment described herein. Elements 802b, 804b, 806b are graphic representations for a receiving communication system 802b, a communication area 804b and an IA group area 806b, respectively. Elements 810, 820, 830, 840 are graphic representations for transmitting communication systems 810, 820, 830, 840 respectively. Elements 814, 824, 834, 844 are graphic representations for transmission signals 814, 824, 834, 844 transmitted from the transmitting communication systems 810, 820, 830, 840 to the receiving communication system 802b, respectively.

In the depicted embodiment, the transmission signal 814 is from outside the IA group area 806b. Therefore it is neither controlled by the transmitting communication system 810 to be aligned nor cancelled by the receiving communication system 802b. The transmission signals 824, 834 are from inside the communication area 804b. They are therefore desired signals for the receiving communication system 802b. They are controlled by the transmitting communication systems 820, 830 respectively to be aligned in a different signal subspace from that of one or more interference signals.

The transmission signal 844 is from outside the communication area 804b and inside the IA group area 806b. Then the transmission signal 844 is controlled by the transmitting communication system 840 to be aligned in a different signal subspace from that of the transmission signals 824, 834 at the receiving communication system 802b.

In summary, the transmitting communication systems 820, 830, 840 control their transmission signals 824, 834, 844 respectively for IA.

Figure 8C:
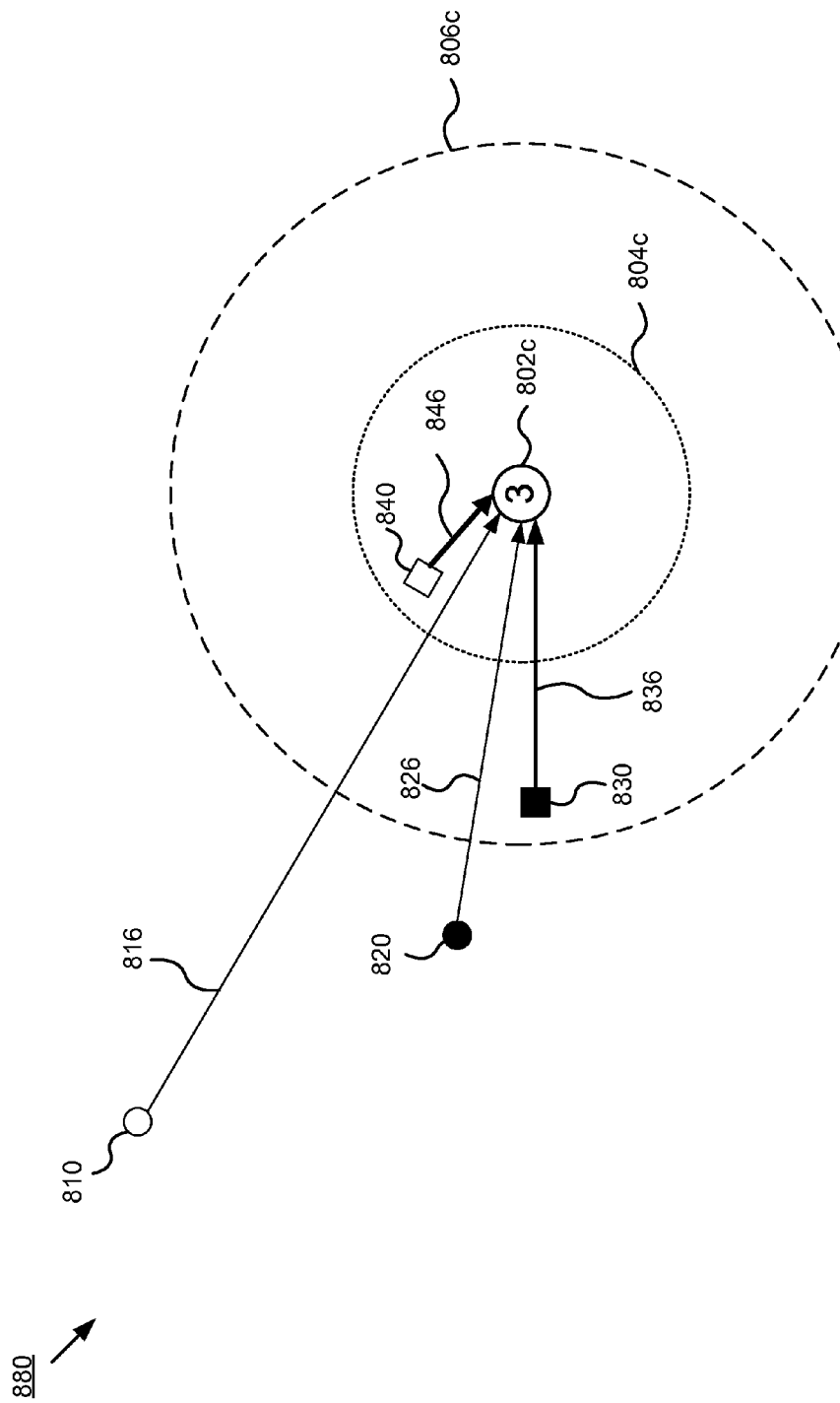

Referring to FIG. 8C, depicted is graphic representations 880 illustrating a communication scenario where the distributed interference alignment is realized using an embodiment described herein. Elements 802c, 804c, 806c are graphic representations for a receiving communication system 802c, a communication area 804c and an IA group area 806c, respectively. Elements 810, 820, 830, 840 are graphic representations for transmitting communication systems 810, 820, 830, 840 respectively. Elements 816, 826, 836, 846 are graphic representations for transmission signals 816, 826, 836, 846 transmitted from the transmitting communication systems 810, 820, 830, 840 to the receiving communication system 802c, respectively.

In the depicted embodiment, the transmission signals 816, 826 are from outside the IA group area 806c. Therefore they are neither controlled by the transmitting communication systems 810, 820 respectively nor cancelled by the receiving communication system 802c. The transmission signal 836 is from outside the communication area 804c and inside the IA group area 806c. Then the transmission signal 836 is aligned into a different signal subspace from that of the desired signal at the receiving communication system 802b. The transmission signal 846 is from inside the communication area 804c. It is therefore the desired signal for the receiving communication system 802c. It is controlled by the transmitting communication system 840 to be aligned. For example, the transmission signal 846 is in a different signal subspace from that of the transmission signal 836.

In summary, the transmitting communication systems 830, 840 control their transmission signals 836, 846 respectively for IA.

Figure 8D:
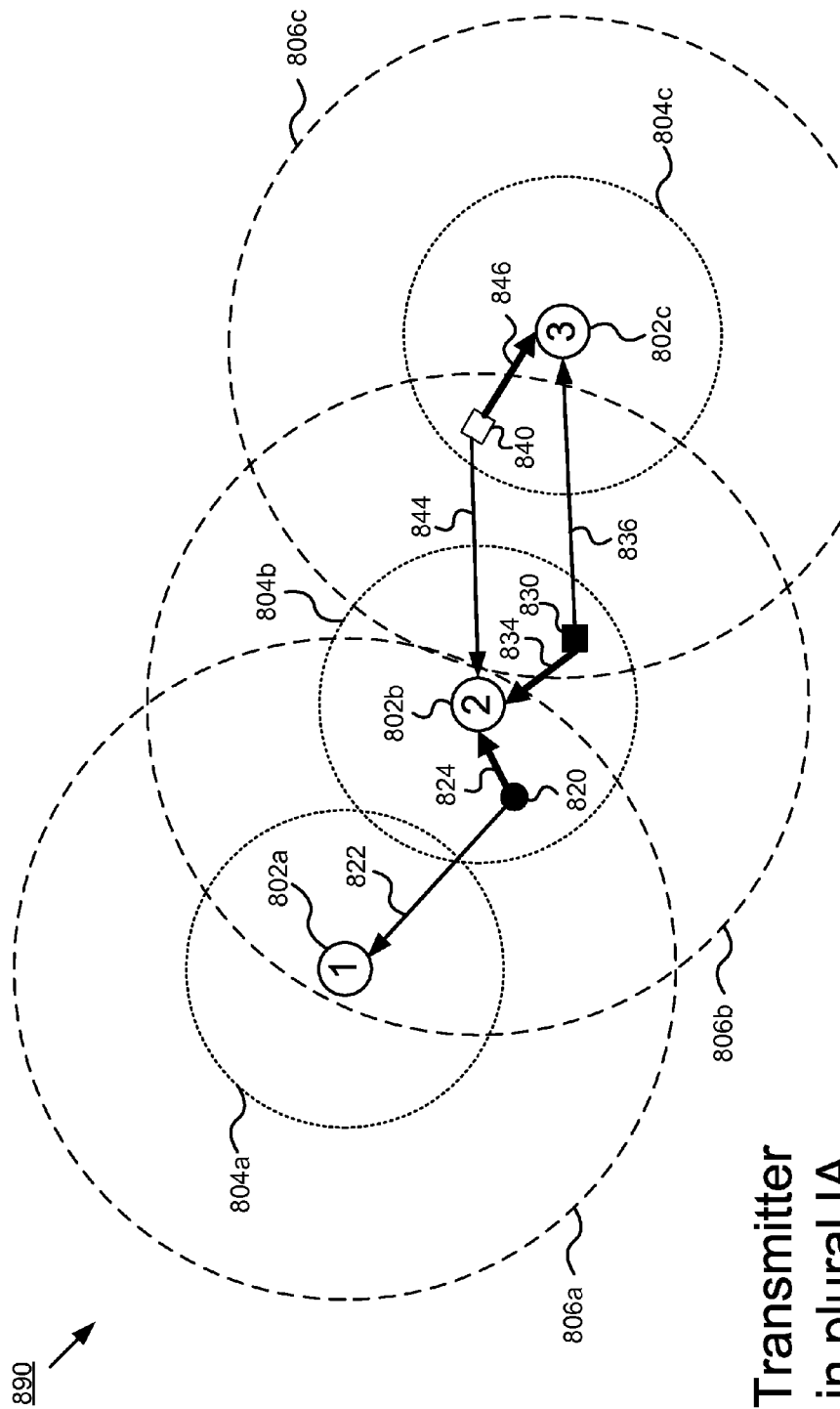

Referring now to FIG. 8D, depicted is graphic representations 890 illustrating a communication scenario where the distributed interference alignment is realized using an embodiment described herein. Elements 802a, 802b, 802c are graphic representations for receiving communication systems 802a, 802b, 802c respectively. Elements 804a, 804b, 804c are graphic representations for communication areas 804a, 804b, 804c for the receiving communication systems 802a, 802b, 802c respectively. Elements 806a, 806b, 806c are graphic representations for IA group areas 806a, 806b, 806c for the receiving communication systems 802a, 802b, 802c respectively.

Element 820 is a graphic representations for transmitting communication system 820. Element 822 is a graphic representation for a transmission signal 822 from the transmitting communication system 820 to the receiving communication system 802a. Element 824 is a graphic representation for a transmission signal 824 from the transmitting communication system 820 to the receiving communication system 802b. In the depicted embodiment, the transmitting communication system 820 is within both the IA group area 806a for the receiving communication system 802a and the communication area 804b for the receiving communication system 802b. Therefore, in one embodiment, the transmitting communication system 820 controls its transmission signals 822, 824 in such a way that the transmission signal 822 is aligned into a different signal subspace from that of one or more desired signals for the receiving communication system 802a and that the transmission signal 824 is received in a different signal subspace from that of one or more interference signals for the receiving communication system 802b. In other words, the transmitting communication system 820 controls its transmission signals 822, 824 to meet requirements for both IA group areas 806a, 806b.

Elements 830, 840 are graphic representations for transmitting communication systems 830, 840. Elements 834, 836 are graphic representations for transmission signals 834, 836 from the transmitting communication system 830 to the receiving communication systems 802b, 802c respectively. Similarly, Elements 844, 846 are graphic representations for transmission signals 844, 846 from the transmitting communication system 840 to the receiving communication system 802b, 802c respectively.

In the depicted embodiment, the transmitting communication system 830 is within both the communication area 804b for the receiving communication system 802b and the IA group area 806c for the receiving communication system 802c. Therefore, in one embodiment, the transmitting communication system 830 controls its transmission signals 834, 836 in such a way that the transmission signal 834 is received in a different signal subspace from that of one or more interference signals for the receiving communication system 802b and that the transmission signal 836 is aligned into a different signal subspace from that of one or more desired signals for the receiving communication system 802c. In other words, the transmitting communication system 830 controls its transmission signals 834, 836 to meet both requirements for IA group areas 806b, 806c.

Similarly, the transmitting communication system 840 is within both the IA group area 806b for the receiving communication system 802b and the communication area 804c for the receiving communication system 802c. Therefore, in one embodiment, the transmitting communication system 840 controls its transmission signals 844, 846 in such a way that the transmission signal 844 is aligned into a different signal subspace from that of one or more desired signals for the receiving communication system 802b and that the transmission signal 846 is received in a different signal subspace from that of one or more interference signals for the receiving communication system 802c. In other words, the transmitting communication system 840 controls its transmission signals 844, 846 to meet requirements for both IA group area 806b, 806c.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method for distributed interference alignment, the method comprising:
   generating source data associated with a vehicle;
   determining one or more associated interference alignment groups (IA), each of the one or more IA groups including one or more communication systems;
   generating data describing a constraint condition for each of the one or more IA groups, the constraint condition being associated with a signal subspace used by a receiving communication system associated with the IA group to filter one or more interference signals;
   calculating a precoding vector based at least in part on the data describing the constraint condition associated with each of the one or more associated IA groups;
   generating a transmission signal based at least in part on the precoding vector and the source data associated with the vehicle; and
   determining the transmission signal as one of a desired signal or an interference signal based on a first threshold distance and a second threshold distance between a transmitting communication system transmitting the transmission signal and the receiving communication system.

2. The method of claim 1, wherein the precoding vector comprises one or more precoding weights.

3. The method of claim 1, wherein the transmission signal is the interference signal for the receiving communication system, the interference signal aligned into a same signal subspace as other interference signals.

4. The method of claim 1, wherein generating the transmission signal based at least in part on the precoding vector and the source data further comprises:
   multiplying the precoding vector to the source data.

5. The method of claim 1 further comprising:
   controlling the transmission signal to arrive at one or more receiving communication systems time-synchronously.

6. A system for realizing distributed interference alignment, the system comprising:
   a control module for generating source data associated with a vehicle;
   a transmitter module for determining one or more associated interference alignment groups (IA), each of the one or more IA groups including one or more communication systems;
   a determination module for generating data describing a constraint condition for each of the one or more IA groups, the constraint condition being associated with a signal subspace used by a receiving communication system associated with the IA group to filter one or more interference signals;
   a precoding module communicatively coupled to the determination module, the precoding module calculating a precoding vector based at least in part on the data describing the constraint condition associated with each of the one or more associated IA groups, the precoding module generating a transmission signal based at least in part on the precoding vector and the source data associated with the vehicle; and
   the determination module for further determining the transmission signal as one of a desired signal or an interference signal based on a first threshold distance and a second threshold distance between a transmitting communication system transmitting the transmission signal and the receiving communication system.

7. The system of claim 6, wherein the precoding vector comprises one or more precoding weights.

8. The system of claim 6, wherein the transmission signal is the interference signal for the receiving communication system, the interference signal aligned into a same signal subspace as other interference signals.

9. The system of claim 6, wherein generating the transmission signal based at least in part on the precoding vector and the source data further comprises:
   multiplying the precoding vector to the source data.

10. The system of claim 6, wherein the precoding module is further configured to:
    control the transmission signal to arrive at one or more receiving communication systems time-synchronously.

11. A computer program product comprising a non-transitory computer readable medium encoding instructions that, in response to execution by a computing device, cause the computing device to perform operations comprising:
    generating source data associated with a vehicle;
    determining one or more associated interference alignment groups (IA), each of the one or more IA groups including one or more communication systems;
    generating data describing a constraint condition for each of the one or more IA groups, the constraint condition being associated with a signal subspace used by a receiving communication system associated with the IA group to filter one or more interference signals;
    calculating a precoding vector based at least in part on the data describing the constraint condition associated with each of the one or more associated IA groups;
    generating a transmission signal based at least in part on the precoding vector and the source data associated with the vehicle; and
    determining the transmission signal as one of a desired signal or an interference signal based on a first threshold distance and a second threshold distance between a transmitting communication system transmitting the transmission signal and the receiving communication system.

12. The computer program product of claim 11, wherein the precoding vector comprises one or more precoding weights.

13. The computer program product of claim 11, wherein the transmission signal is the interference signal for the receiving communication system, the interference signal aligned into a same signal subspace as other interference signals.

14. The computer program product of claim 11, wherein generating the transmission signal based at least in part on the precoding vector and the source data further comprises:
    multiplying the precoding vector to the source data.

15. The computer program product of claim 11, wherein instructions encoded in the computer readable medium when executed cause the computing device to perform operations further comprising:
    controlling the transmission signal to arrive at one or more receiving communication systems time-synchronously.

16. The method of claim 1, wherein
determining the transmission signal as the desired signal includes determining a distance of the transmitting communication system from the receiving communication system to be less than the first threshold distance, and
determining the transmission signal as the interference signal includes determining the distance of the transmitting communication system from the receiving communication system to be more than the first threshold distance and less than the second threshold distance.

17. The method of claim 1, wherein the second threshold distance is greater than the first threshold distance and each of the one or more IA groups is associated with an area having a radius equal to the second threshold distance.

18. The system of claim 6, wherein
to determine the transmission signal as the desired signal includes determining a distance of the transmitting communication system from the receiving communication system to be less than the first threshold distance, and
to determine the transmission signal as the interference signal includes determining the distance of the transmitting communication system from the receiving communication system to be more than the first threshold distance and less than the second threshold distance.

19. The system of claim 6, wherein the second threshold distance is greater than the first threshold distance and each of the one or more IA groups is associated with an area having a radius equal to the second threshold distance.

20. The computer program product of claim 11, wherein
determining the transmission signal as the desired signal includes determining a distance of the transmitting communication system from the receiving communication system to be less than the first threshold distance, and
determining the transmission signal as the interference signal includes determining the distance of the transmitting communication system from the receiving communication system to be more than the first threshold distance and less than the second threshold distance.

21. The computer program product of claim 11, wherein the second threshold distance is greater than the first threshold distance and each of the one or more IA groups is associated with an area having a radius equal to the second threshold distance.

* * * * *